United States Patent
Kerner

(10) Patent No.: US 7,451,039 B2
(45) Date of Patent: Nov. 11, 2008

(54) METHOD FOR ACTUATING A TRAFFIC-ADAPTIVE ASSISTANCE SYSTEM WHICH IS LOCATED IN A VEHICLE

(75) Inventor: Boris Kerner, Stuttgart (DE)

(73) Assignee: Daimler AG, Stuttgart (DE)

( * ) Notice: Subject to any disclaimer, the term of this patent is extended or adjusted under 35 U.S.C. 154(b) by 216 days.

(21) Appl. No.: 10/546,716

(22) PCT Filed: Feb. 7, 2004

(86) PCT No.: PCT/EP2004/001138

§ 371 (c)(1),
(2), (4) Date: Jun. 14, 2006

(87) PCT Pub. No.: WO2004/076223

PCT Pub. Date: Sep. 10, 2004

(65) Prior Publication Data

US 2007/0150167 A1    Jun. 28, 2007

(30) Foreign Application Priority Data

Feb. 25, 2003  (DE) .............................. 103 08 256

(51) Int. Cl.
*B60T 7/12* (2006.01)
(52) U.S. Cl. ..................... 701/117; 701/96; 701/300
(58) Field of Classification Search ................ 701/93, 701/96, 117, 119, 300, 301; 180/170–179
See application file for complete search history.

(56) References Cited

U.S. PATENT DOCUMENTS

| | | | |
|---|---|---|---|
| 6,985,805 B2 * | 1/2006 | Sudou et al. | 701/96 |
| 7,184,874 B2 * | 2/2007 | Michi et al. | 701/96 |
| 7,231,288 B2 * | 6/2007 | Koulinitch | 701/96 |

FOREIGN PATENT DOCUMENTS

| | | |
|---|---|---|
| DE | 691 23 947 T2 | 11/1990 |
| DE | 100 19 190 A1 | 10/2001 |
| EP | 0 443 644 A1 | 2/1990 |
| EP | 0 484 995 B1 | 5/1992 |
| EP | 1 063 626 A1 | 12/2000 |
| EP | 1 225 079 A2 | 7/2002 |

OTHER PUBLICATIONS

Boris S. Kerner, "Empirical Macroscopic Features of Spatial-Temporal Traffic Patterns at Highway Bottlenecks", Physical Review E, 2002, pp. 1-30, vol. 65, 046138, The American Physical Society.

* cited by examiner

*Primary Examiner*—Richard M. Camby
(74) *Attorney, Agent, or Firm*—Crowell & Moring LLP

(57) ABSTRACT

The invention relates to a method for actuating a traffic-adaptive assistance system in a host vehicle, using speed-related and/or distance-related variables of the vehicle and of a preceding vehicle, to control acceleration or deceleration of the vehicle. If the actual time interval or the actual distance between the vehicle and the preceding vehicle is greater than a predefinable respective lower limiting value and smaller than a predefinable respective upper limiting value the assistance system is actuated without regard to an otherwise applicable target time or distance time interval.

16 Claims, 2 Drawing Sheets

METHOD FOR ACTUATING A TRAFFIC-ADAPTIVE ASSISTANCE SYSTEM WHICH IS LOCATED IN A VEHICLE

BACKGROUND AND SUMMARY OF THE INVENTION

This application claims the priority of German patent document 103 08 256.5, filed Feb. 25, 2003 (PCT International Application No. PCT/EP2004/001138, filed Feb. 7, 2003), the disclosure of which is expressly incorporated by reference herein.

The invention relates to a method for operating a traffic-adaptive assistance system in a vehicle (the "host vehicle"), which uses speed-related and/or distance-related variables of the host vehicle and of a preceding vehicle to accelerate or decelerate the host vehicle.

In a method of this type disclosed in German patent document DE 10019190 A1, the value of the acceleration or deceleration of a vehicle is limited by the traffic-adaptive assistance system using a lower and/or upper limits. European patent document EP 0443644 A1, on the other hand, proposes to actuate a traffic-adaptive assistance system using a target distance, while European patent document EP 1063626 A1 discloses actuating a traffic-adaptive assistance system with different individual time intervals or distances relative to a preceding vehicle. In European patent document EP 1225079 A2, a traffic-adaptive assistance system is actuated based on a target distance of a vehicle from a preceding vehicle.

One object of the present invention is to provide a method for actuating a traffic-adaptive assistance system which is flexible, behaves in a manner that emulates the behavior of real vehicle drivers, and achieves good reaction times.

This and other objects and advantages are achieved by the method according to the invention, in which the traffic-adaptive assistance system is actuated without regard to any target time interval or target distance, if the actual time interval and/or the actual distance between the host vehicle and the preceding vehicle is greater than a predefinable respective lower limiting value and smaller than a predefinable respective upper limiting value.

The invention in effect 'automatically" takes into account the prevailing traffic situation and the travel history of the host vehicle (for example the driving behavior in the last ten minutes) during the operation of the traffic-adaptive assistance system. This is because, if the actual time interval or the actual distance between the host vehicle and the preceding vehicle is within predefinable limiting values (that is, greater than the predefinable lower limiting value and smaller than the predefinable upper limiting value, as noted above), control of the traffic-adaptive assistance system based on a target time interval or target distance is dispensed with or suppressed, thereby achieving a particularly flexible actuation. In this context, alternatively either just one actual time interval or just one actual distance or a combination of the two is provided, while a situation-dependent selection may also be provided in the vehicle.

While the methods presented in the prior art for operating traffic-adaptive assistance systems influence the "effects" of its actuation (for example, an acceleration value determined by the traffic-adaptive assistance system is limited), the invention intervenes earlier, with regard to the "causes", by directly selecting the variables which are provided for the actuation of the traffic-adaptive assistance system. In other words, with the method according to the invention it become possible to introduce an additional "degree of freedom" by dispensing with the use of a target time interval or distance for the purpose of actuation. Thus, allowance is made for the prevailing traffic situation in that the time interval (or the distance) which then exists between the two vehicles after an acceleration or deceleration of the vehicle has ended is not predetermined by the traffic-adaptive assistance system (i.e., for when a differential speed of virtually zero is present between the vehicle and the preceding vehicle).

In the methods which are presented in the prior art for actuating traffic-adaptive assistance systems, fixed time intervals and distances which are determined according to fixedly predefined relationships, and are always maintained. In contrast, a time interval or distance which is achieved according to the invention as a result of an acceleration process or deceleration process of the vehicle is the consequence of a respective traffic situation and/or of a respective vehicle history. This is an impressive indication of the behavior of the method according to the invention which is adapted to the properties of real vehicle drivers. This is because even though, according to the invention, the time interval or the distance can assume any desired value between the predefinable lower and upper limiting values (i.e., selection from an infinitely large number of values), in the methods presented in the prior art these are only a single discrete value or a small number of discrete values.

One particularly simple embodiment of the invention is obtained if either or both of the lower and upper limiting values is implemented as a constant. As a result, necessary calculations can be carried out particularly quickly, and in a traceable fashion.

The invention can be applied even more flexibly if one or both limiting values can be predefined as a function of the speed of the host vehicle and/or of the speed of a further vehicle (for example, a preceding vehicle), which permits the respective traffic situation to be taken into account.

In one particularly advantageous embodiment of the invention, the lower and/or upper limiting values are predefinable as a function of the type of "traffic state phase" prevailing at the position of the host vehicle. (Traffic state phases distinguish the prevailing traffic state in a particularly easy way. One traffic state phase is, for example, compressed synchronized traffic. These traffic state phases are explained in more detail in the three phase theory of traffic, see for example B. S. Kerner, Phys. Rev. E Vol. 65, 046138, 2002.)

A particularly large degree of flexibility of the invention is obtained if the lower limiting value and/or the upper limiting value can be predefined as a function of the chronological/spatial distribution of the traffic in the surroundings of the host vehicle. A chronological distribution is, for example, a predicted (chronological) development of the traffic, a spatial distribution is, for example, a (spatial) change, i.e., a gradient, in the speed and/or the traffic density in front of the host vehicle. The surroundings of the vehicle extend, for example, over an area of 300 to 500 meters. Smaller surroundings can also be provided. Surroundings comprise here not only the lane on which the host vehicle is located but also secondary lanes.

One particularly advantageous embodiment uses only the differential speed of the vehicles to actuate the traffic-adaptive assistance system. This ensures that the actuation is efficient, and at the same time particularly simple and easy to handle in terms of computing technology.

If the actual time interval or distance between the host vehicle and the preceding vehicle is smaller than the predefinable lower limiting value, the traffic-adaptive assistance system preferably decelerates the vehicle. On the other hand, the actual time interval or distance is greater than the predefinable upper limiting value, the traffic-adaptive assistance system will preferably accelerates the vehicle.

In one advantageous embodiment of the invention, the traffic-adaptive assistance system is additionally actuated based on the distance from at least one further vehicle. This further vehicle may be, for example, a vehicle which is located next to the vehicle in an adjacent lane.

In a further advantageous embodiment of the invention, the traffic-adaptive assistance system is also actuated based on the speed of at least one further vehicle (for example, a vehicle next to the vehicle in an adjacent lane).

In one embodiment, the method according to the invention is preferably implemented in the form of a computer program, which is carried out when the program is run on a computer.

A further preferred embodiment of the invention is in the form of a computer program product comprising a computer program stored on a computer-readable data carrier to carry out the method according to the invention when the program is run on a computer.

Other objects, advantages and novel features of the present invention will become apparent from the following detailed description of the invention when considered in conjunction with the accompanying drawings.

DETAILED DESCRIPTION OF THE DRAWINGS

Figure 1:
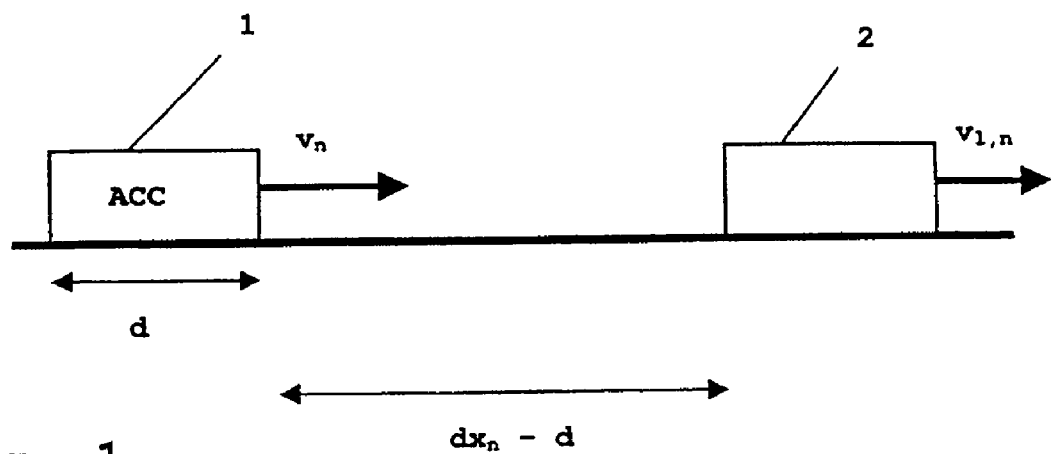
FIG. 1 is a schematic diagram which shows a vehicle having a traffic-adaptive assistance system and a preceding vehicle.

FIG. 1 shows the host vehicle 1 with a traffic-adaptive assistance system ACC (Automatic Cruise Control) at the time n. The vehicle 1 travels at the speed $v_n$. Furthermore, a vehicle 2 which travels at the speed $v_{1,n}$ is illustrated. The two vehicles 1, 2 are separated by a current distance of $dx_n$-d (where d corresponds to the length of the vehicle) and a time interval of $\Phi$. Here, $\Phi$ may be dependent on the vehicle speed $v_n$ and/or on the speed of other vehicles.

The traffic-adaptive assistance system ACC is actuated using the described variables. At the time n it determines an acceleration or deceleration (negative acceleration) $a_n$ for the vehicle 1. As a result the following is obtained:

$$a_n = f(K_1((dx_n-d)-\Phi^* v_n), K_2(v_{1,n}-v_n)). \quad (1)$$

If $$v_n = v_{1,n} = v_n^{(0)} \quad (2)$$

and $$(dx_n-d) = \Phi^* v_n^{(0)} = \Phi^{(0)} * v_n^{(0)} \quad (3)$$

apply, $a_n=0$ (i.e. there is no acceleration or deceleration of the vehicle 1 by the traffic-adaptive assistance system ACC). In addition, the vehicle is driven for a time interval—which can be specified as a constant or as a function of the speed of the vehicle (speeds of the vehicle):

$$\Phi^{(0)} = (dx_n-d)/v_n^{(0)} \quad (4).$$

Figure 2:
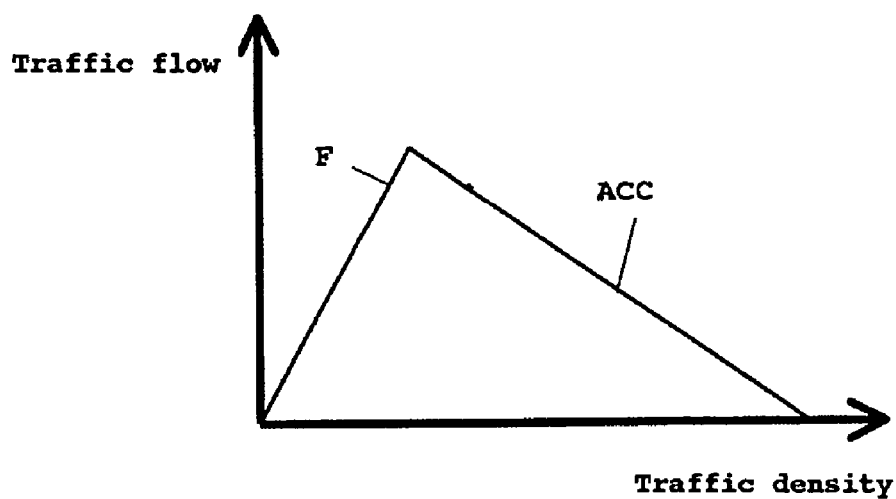
FIG. 2 is a diagram of a traffic-adaptive vehicle assistance system according to the prior art.

This results in a known basic diagram $q(\rho)$, see FIG. 2, for various traffic densities and speeds $v_n^{(0)}$. The traffic density $\rho$ corresponds to the reciprocal of the distance between vehicles, $\rho=1/dx_n$).

FIG. 2 is a diagram $q(\rho)$ which illustrates the operation of a traffic-adaptive assistance system according to the prior art. The traffic flow (q) is plotted on the ordinate, and the traffic density $\rho$ is plotted on the abscissa. In this context, the traffic flow is determined as a function of the traffic density using the formula (4), with the traffic flow q being defined as $$q = \rho * v_n^{(0)}.$$

A line F which is determined in this way is drawn in FIG. 2 in accordance with the free traffic. Furthermore, a line ACC is drawn which corresponds to the setting by a traffic-adaptive assistance system which is known from the prior art. Thus, FIG. 2 illustrates all the value pairs of traffic density and traffic flow which can be selected by means of a traffic-adaptive assistance system according to the prior art.

Figure 3:
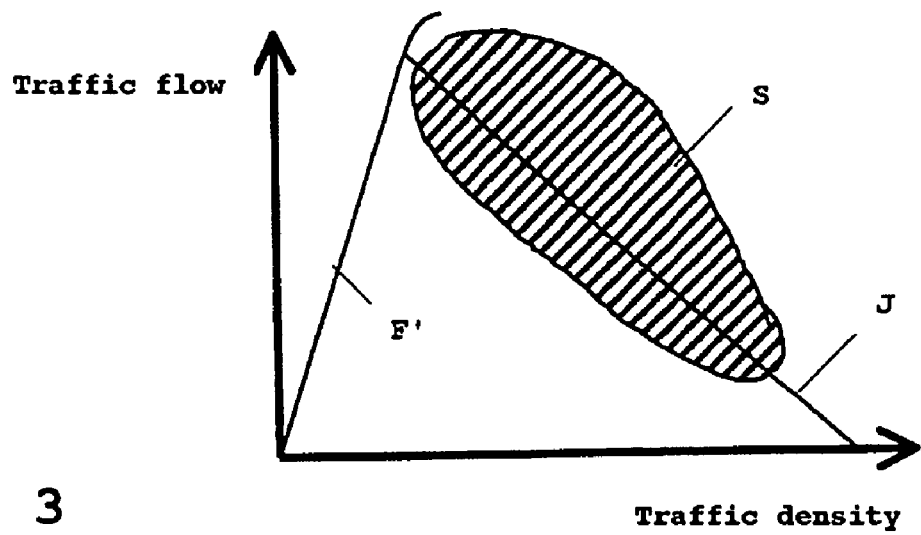
FIG. 3 is a schematic illustration of the two-dimensional surface of the spatially homogenous and chronologically independent solutions according to the three phase theory of traffic.

For FIG. 3, reference is made to the known three phase theory of traffic. (See, for example, B. S. Kerner, Phys, Rev. E Vol. 65, 046138, 2002.) In this theory there is no basic diagram (like the one illustrated by way of example in FIG. 2) but instead there is a two-dimensional area of the spatially homogenous and chronologically independent solutions as value pairs of traffic density and traffic flow. Thus, in FIG. 3, the traffic density $\rho$ is in turn plotted on the abscissa and the traffic flow q on the ordinate. A curve F' which corresponds to the free traffic is shown. Furthermore, FIG. 3 shows a region S of synchronized traffic, represented by hatching here, and a line J of congested traffic.

The two-dimensional area (illustrated in FIG. 3) of the spatially homogenous and chronologically independent solutions has been predicted theoretically and confirmed experimentally. As a result, the behavior resulting from the properties of real vehicle drivers is simulated, However, as is apparent from FIG. 2, prior art traffic-adaptive assistance systems do not, in principle, exhibit this behavior, which is problematic with the actuation of traffic-adaptive assistance systems. One problem is, for example, a lack of "damping" of such systems if a plurality of vehicles which are equipped with traffic-adaptive assistance systems drive one behind the other. This can lead to uncontrolled behavior of individual vehicles. Here, the present invention intervenes and solves such problems according to the invention by implementing the three phase theory of traffic in a method for actuating a traffic-adaptive assistance system.

Figure 4:
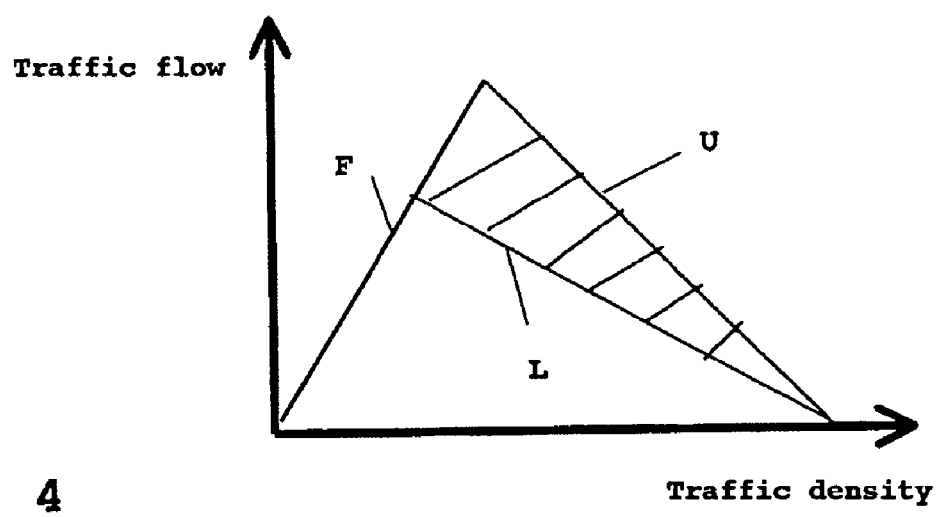
FIG. 4 shows by way of example a use according to the invention of the three phase theory for a traffic-adaptive assistance system.

The effect of a traffic-adaptive assistance system that is actuated according to the invention is illustrated in FIG. 4, for the case in which both the lower and upper limiting values are predefined as constants. In this case, the a line U corresponds to the upper limiting value, the line L corresponds to the lower limiting value, and the line F represents free traffic. This representation can in turn also be interpreted in a way which is analogous to FIG. 2; that is, as all the value pairs of traffic density and traffic flow which can be selected by a traffic-adaptive assistance system which is actuated according to the invention. In contrast to FIG. 2, the excellent agreement with the theoretically predicted, experimentally confirmed, real conditions which are presented in FIG. 3 is notable here. The actuation according to the invention of a traffic-adaptive assistance system permits a surprising degree of similarity to the method resulting from the properties of real vehicle drivers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for controlling a traffic-adaptive assistance system in a host vehicle based on at least one of speed-related and distance-related variables of the host vehicle and of a preceding vehicle; said method comprising:

using said at least one of speed-related and distance related variables to control acceleration or deceleration of the vehicle;

wherein, if one of an actual time interval and an actual distance between the host vehicle and the preceding vehicle is greater than a predefinable respective lower limiting value and smaller than a predefinable upper limiting value the assistance system a controlled without reference to a target time interval.

2. The method as claimed in claim 1, wherein at least one of the upper limiting value and the lower limiting value is predefinable as a constant.

3. The method as claimed in claim 1, wherein the lower limiting value is predefinable as a function of at least one of speed of the host vehicle and speed of at least one further vehicle.

4. The method as claimed in claim 3, wherein the upper limiting value is predefinable as a function of at least one of speed of the host vehicle and speed of at least one further vehicle.

5. The method as claimed in claim 4, wherein at least one of the lower limiting value and the upper limiting value is predefinable as a function of a type of traffic state phase prevailing at the position of the host vehicle.

6. The method as claimed in claim 5, wherein at least one of the lower and upper limiting values is predefinable as a function of chronological/spatial distribution of traffic in an area surrounding the host vehicle.

7. The method as claimed in claim 6, wherein the assistance system is actuated using only a relative speed of the host vehicle and the preceding vehicle.

8. The method as claimed in claim 7, wherein, if the actual time interval or the actual distance between the host vehicle and the preceding vehicle is smaller than the lower limiting value, the assistance system decelerates the vehicle.

9. The method as claimed in claim 7, wherein, if the actual time interval or the actual distance between the host vehicle and the preceding vehicle is greater than the upper limiting value, the assistance system accelerates the vehicle.

10. The method as claimed in claim 9, wherein the assistance system is additionally controlled in response to distance from at least one further vehicle.

11. The method as claimed in claim 10, wherein the assistance system is additionally controlled in response to speed of at least one further vehicle.

12. A computer program product comprising, on computer-readable medium, a program for carrying out the method as claimed in claim 1, when the program product is run on a computer.

13. A method of operating a traffic-adaptive automotive cruise control system in a host vehicle, said method comprising:

controlling acceleration and deceleration of the host vehicle based on at least one of speed and distance related variables that characterize a relationship of the host vehicle and the preceding vehicle, said speed and distance related variables including at least one of a target time interval and a target distance interval between the host vehicle and the preceding vehicle; and suppressing application of said time or distance interval for controlling said acceleration and deceleration when one of an actual distance and an actual time interval between the host vehicle and the preceding interval is within predefinable upper and lower limits.

14. The method according to claim 13, wherein said speed and distance related variables include a differential speed of the host vehicle relative to the preceding vehicle.

15. The method according to claim 14, wherein, in said controlling step:

if the actual time or distance interval between the host vehicle and the preceding vehicle is less than the predefinable lower limit the host vehicle is decelerated based on said at least one of a target time interval and a target distance interval; and if the actual time or distance interval exceeds the predefinable upper limit, the host vehicle is accelerated based on said at least one of a target time interval and a target distance interval.

16. The method according to claim 15, wherein at least one of said upper limit and said lower limit is predefinable as a function of host vehicle speed.

* * * * *